US009963187B1

(12) United States Patent
Quan et al.

(10) Patent No.: US 9,963,187 B1
(45) Date of Patent: May 8, 2018

(54) AERODYNAMIC BICYCLE FRAME (71) Applicant: Accell North America, Inc., Kent, WA (US)

(72) Inventors: Kevin Quan, Toronto (CA); Philippe Lavoie, North York (CA)

(73) Assignee: Accell North America, Inc., Kent, WA (US)

( * ) Notice: Subject to any disclaimer, the term of this patent is extended or adjusted under 35 U.S.C. 154(b) by 0 days. days.

(21) Appl. No.: 15/687,281

(22) Filed: Aug. 25, 2017

(51) Int. Cl.
*B62K 19/02* (2006.01)
*B62K 3/02* (2006.01)
*B62K 21/12* (2006.01)
*B62K 21/02* (2006.01)

(52) U.S. Cl.
CPC ............... *B62K 19/02* (2013.01); *B62K 3/02* (2013.01); *B62K 21/02* (2013.01); *B62K 21/12* (2013.01)

(58) Field of Classification Search
CPC .......... B62K 19/02; B62K 19/06; B62K 3/02; B63B 1/34
See application file for complete search history.

(56) References Cited

U.S. PATENT DOCUMENTS

| | | | | |
|---|---|---|---|---|
| 2,800,291 A * | 7/1957 | Stephens | ................ | B62D 35/00 114/67 R |
| 4,455,045 A * | 6/1984 | Wheeler | ................ | B62D 35/00 105/1.2 |
| 4,776,535 A * | 10/1988 | Paterson | ................ | B62D 35/00 138/37 |
| 4,813,635 A * | 3/1989 | Paterson | ............. | B62D 35/001 102/490 |
| 4,830,315 A * | 5/1989 | Presz, Jr. | ................ | B64C 21/10 114/102.29 |
| 5,415,423 A * | 5/1995 | Allsop | ................... | B29C 45/006 280/281.1 |
| 5,975,462 A * | 11/1999 | Platzer | .................... | B63B 1/248 244/11 |
| 6,074,308 A * | 6/2000 | Domas | ................... | A63B 53/04 473/327 |
| 7,210,694 B2 * | 5/2007 | Trenne | ................... | B62K 21/18 188/24.11 |
| 7,931,289 B2 * | 4/2011 | Buckenberger | .......... | B62K 3/04 224/427 |
| 7,967,315 B2 * | 6/2011 | Soucek | .................. | B62K 19/02 280/274 |
| 8,220,815 B2 * | 7/2012 | Buckenberger | .......... | B62K 3/04 224/427 |

(Continued)

OTHER PUBLICATIONS

Heather Clark, Doctor of Philosophy, "Characterization and estimation of three-dimensional structure in unforced and forced blunt trailing edge wake flows", thesis submitted to Graduate Department of the Institute for Aerospace Studies, University of Toronto, 2016.

*Primary Examiner* — Joseph M Rocca
*Assistant Examiner* — Michael R Stabley
(74) *Attorney, Agent, or Firm* — Kolisch Hartwell, P.C.

(57) ABSTRACT

An aerodynamic bicycle frame may include one or more elongate frame members having a rounded leading edge, a blunt trailing edge, and a plurality of vortex-generating channels formed at opposite corners of the trailing edge. Successive pairs of such channels may be spaced apart by a selected distance, such as a distance corresponding to a wavelength of the expected flow instability.

16 Claims, 11 Drawing Sheets

(56) References Cited

U.S. PATENT DOCUMENTS

| | | | | |
|---|---|---|---|---|
| 8,408,574 | B2* | 4/2013 | Callahan | B62K 3/04 280/274 |
| 8,469,313 | B2* | 6/2013 | Dong | B64C 23/06 244/123.1 |
| 8,925,949 | B2* | 1/2015 | Zecchetto | B62K 3/02 280/281.1 |
| 2007/0222178 | A1* | 9/2007 | Davis | B62K 19/16 280/281.1 |
| 2010/0225090 | A1* | 9/2010 | Cusack | B62K 3/04 280/281.1 |
| 2015/0050154 | A1* | 2/2015 | Dixon | F03D 1/0633 416/223 A |

\* cited by examiner

AERODYNAMIC BICYCLE FRAME

FIELD

This disclosure relates to systems and methods for improving the aerodynamics of bicycles. More specifically, the disclosed embodiments relate to bicycle frames having drag-reducing features.

INTRODUCTION

The aerodynamic drag of a bicycle is an important factor affecting speed in competitive cycling events, such as triathlons, time trials, and the like. Reducing drag leads to higher speeds and better competitive results. Accordingly, improvement in the aerodynamic design of bicycles and bicycle components is highly desirable.

Various bicycle designs have incorporated airfoils (teardrop-shaped components used in fluid dynamic applications) to reduce drag, and/or reduced frontal area of the surface(s) exposed to airflow. While different cross-sectional shapes have been utilized for bicycle frame components, frame tubes typically have a blunt trailing edge (e.g., round, oval, Kamm profile, or the like) resulting in advantages such as structural strength and component clearance.

Various approaches for improving bicycle frame aerodynamics have been attempted. For example, bike frame modifications, such as dimpled leading edges, have been used to disrupt laminar flow. These and other attempts to address aerodynamic issues have met with varying levels of success.

SUMMARY

Aerodynamic bicycle frames according to the present teachings reduce drag on the frame components by including symmetrically-placed, trailing-edge scoop features to passively suppress vortex shedding and reduce drag. The present disclosure provides systems, apparatuses, and methods relating to aerodynamic bicycle frames.

In some embodiments, a bicycle may include: a bicycle frame coupled to a front fork, the frame and fork in combination including an elongate member having a side-to-side width and defining an airfoil having a blunt trailing edge; and an array of one or more pairs of vortex generators on the blunt trailing edge, each pair of vortex generators including a left vortex generator disposed on a left corner of the blunt trailing edge and a symmetrical right vortex generator disposed on a right corner of the blunt trailing edge; wherein each vortex generator comprises a recess formed in the elongate member, the recess having a bowl-shaped front end portion extending rearward as an open channel, the vortex generator having a maximum vertical dimension smaller than the width of the elongate member.

In some embodiments, a bicycle frame may include: a front triangle including a down tube having a first lateral width and a seat tube having a second lateral width; a plurality of first recessed vortex generators symmetrically disposed on opposing corners of a blunt trailing edge of the down tube, each of the first recessed vortex generators comprising a scoop formed in a respective one of the opposing corners of the blunt trailing edge and having a first vertical dimension approximately equal to 0.6 times the first lateral width; and a plurality of second recessed vortex generators symmetrically disposed on opposing corners of a blunt trailing edge of the seat tube, each of the second recessed vortex generators comprising a scoop formed in a respective one of the opposing corners of the blunt trailing edge and having a second vertical dimension approximately equal to 0.6 times the second lateral width.

In some embodiments, a bicycle may include: a frame including a plurality of elongate frame members; a front fork assembly pivotably coupled to the frame; and a handlebar steerably coupled to the front fork assembly; wherein a first frame member of the plurality of frame members has a rounded leading edge, a blunt trailing edge, and a first lateral width, the blunt trailing edge including a first open channel disposed at a left corner of the trailing edge and an opposing second open channel disposed at a right corner of the trailing edge, each of the open channels extending horizontally across a rear portion of a respective lateral side of the first frame member.

Features, functions, and advantages may be achieved independently in various embodiments of the present disclosure, or may be combined in yet other embodiments, further details of which can be seen with reference to the following description and drawings.

DESCRIPTION

Various aspects and examples of an aerodynamic bicycle frame having trailing-edge scoop-shaped features, as well as related methods, are described below and illustrated in the associated drawings. Unless otherwise specified, an aerodynamic bicycle frame according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Directional terms, such as "forward," "rearward," "front," and "rear" (and the like) are intended to be understood in the context of a host vehicle (e.g., bicycle) on which systems described herein may be included. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "leading" or "forward" means toward the front portion of the vehicle, and "trailing" or "rearward" means toward the rear of the vehicle. In the absence of a host vehicle, the same directional terms may be used as if the vehicle were present. For example, even when viewed in isolation, a frame tube may have a leading edge, based on the fact that the frame tube would be incorporated with the edge portion in question facing in the direction of the front portion of a host bicycle.

"Coupled" means connected, either permanently or releasably, whether directly or indirectly through intervening components.

Overview

In general, aerodynamic bicycle frames disclosed herein may include a plurality of symmetrically-opposed, vortex-generating scoops or channels formed at trailing edges of one or more frame tubes and/or fork blades. Bicycle frames typically comprise a combination of frame tubes (top tube, down tube, seat tube, etc.), each of which has an aerodynamic profile formed by its cross-sectional shape. Although some frames incorporate fully-streamlined aerodynamic airfoils, for structural, manufacturability, and other reasons, the tube profiles often present a trailing edge that does not taper to a point. For example, frame tubes often have a round, oval, rounded rectangle, or truncated-teardrop (e.g., Kamm) cross section. As used herein, these frame tubes will be referred to as having a "blunt trailing edge" (e.g., blunt trailing edge airfoils).

While such blunt trailing edge airfoils have certain frame-related advantages, such as structural thickness, they also result in a higher amount of drag, e.g., caused by vortex shedding, and potentially unsteady aerodynamic loading. Accordingly, it is advantageous to at least partially control the wake to reduce drag and suppress vortex shedding. Bicycle frames described herein use selectively spaced geometric modifications of the blunt trailing edge to achieve these effects passively.

Specifically, an array of recessed vortex generators is formed by shaped depressions or scoop features on the trailing edges of one or more frame tubes. These scoop features may be alternatively referred to as depressions, scoops, valleys, channels, cups, and/or grooves, and may further be described as open and/or open-ended. The scoop features are included in symmetric pairs, with one on each lateral side or corner of the tube's trailing edge. Each scoop is a vortex generator, and the pair of opposed scoops sets up counter-rotating, streamwise vortices that interfere with the natural wake to reduce drag. Additional pairs are spaced at selected intervals along the length of the tube to provide further coverage. Any suitable spacing may be used. However, as described below, spacing of the pairs may be based on a characteristic wavelength of the expected flow instability.

Examples, Components, and Alternatives

The following sections describe selected aspects of exemplary aerodynamic bicycle frames, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Bicycle and Frame

As shown in FIGS. 1-9, this section describes an illustrative bicycle 10 having an aerodynamic frame 12 with drag-reducing vortex generator features. Frame 12 and its features are examples of the aerodynamic frames described in the Overview section above.

Figure 1:
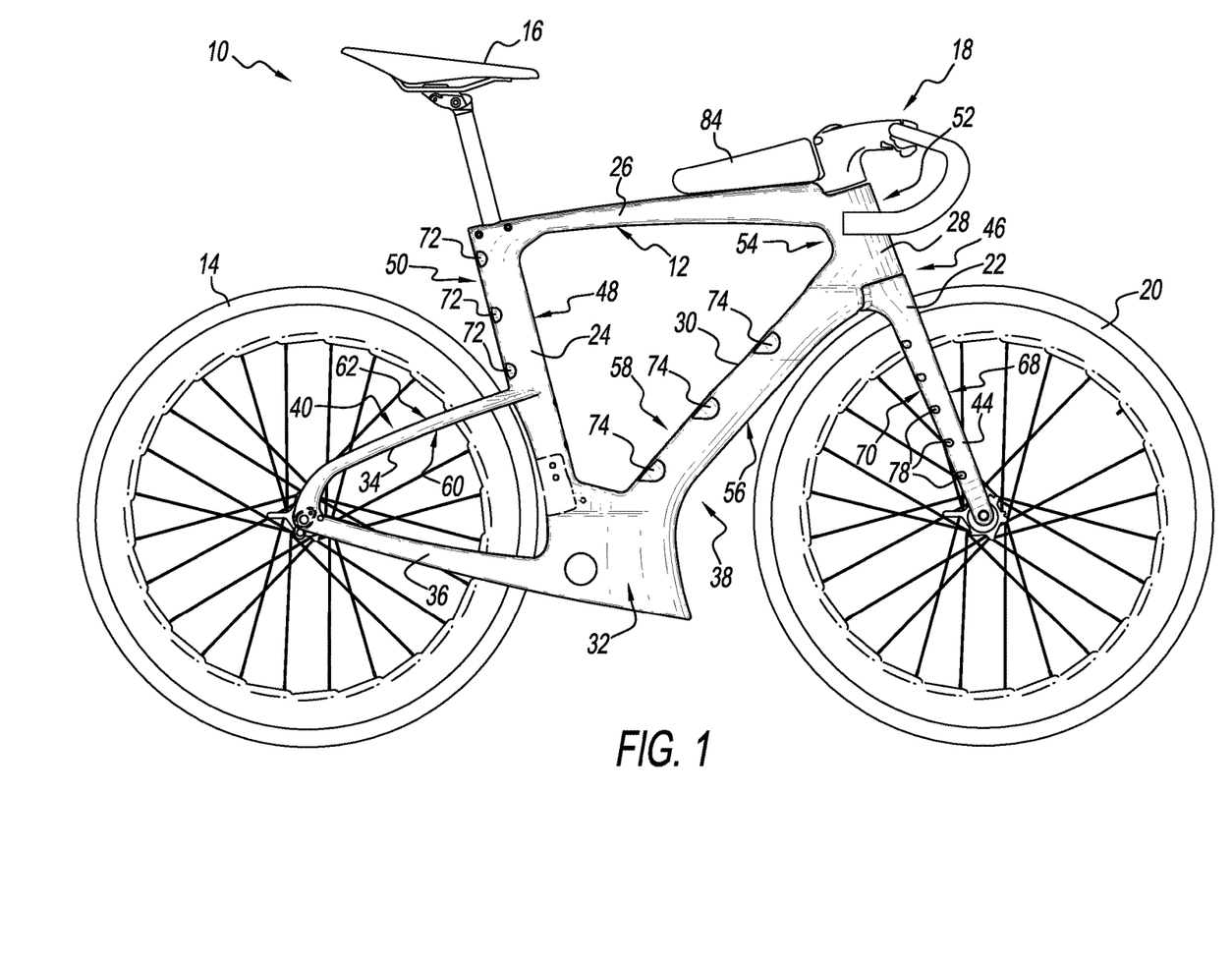
FIG. 1 is a left side elevation view of an illustrative bicycle in accordance with aspects of the present disclosure.
Figure 2:
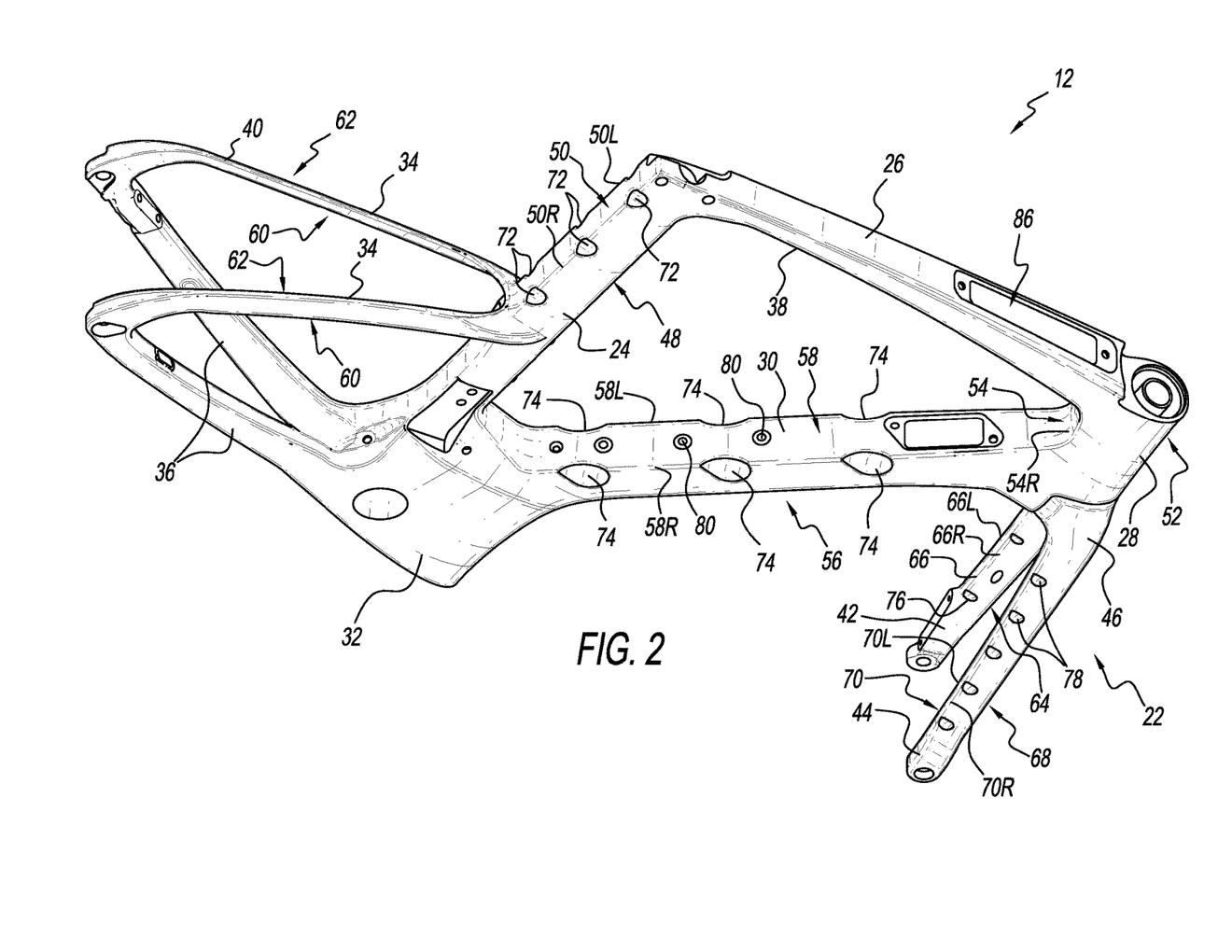
FIG. 2 is an isometric view of a frame portion of the bicycle of FIG. 1.
Figure 3:
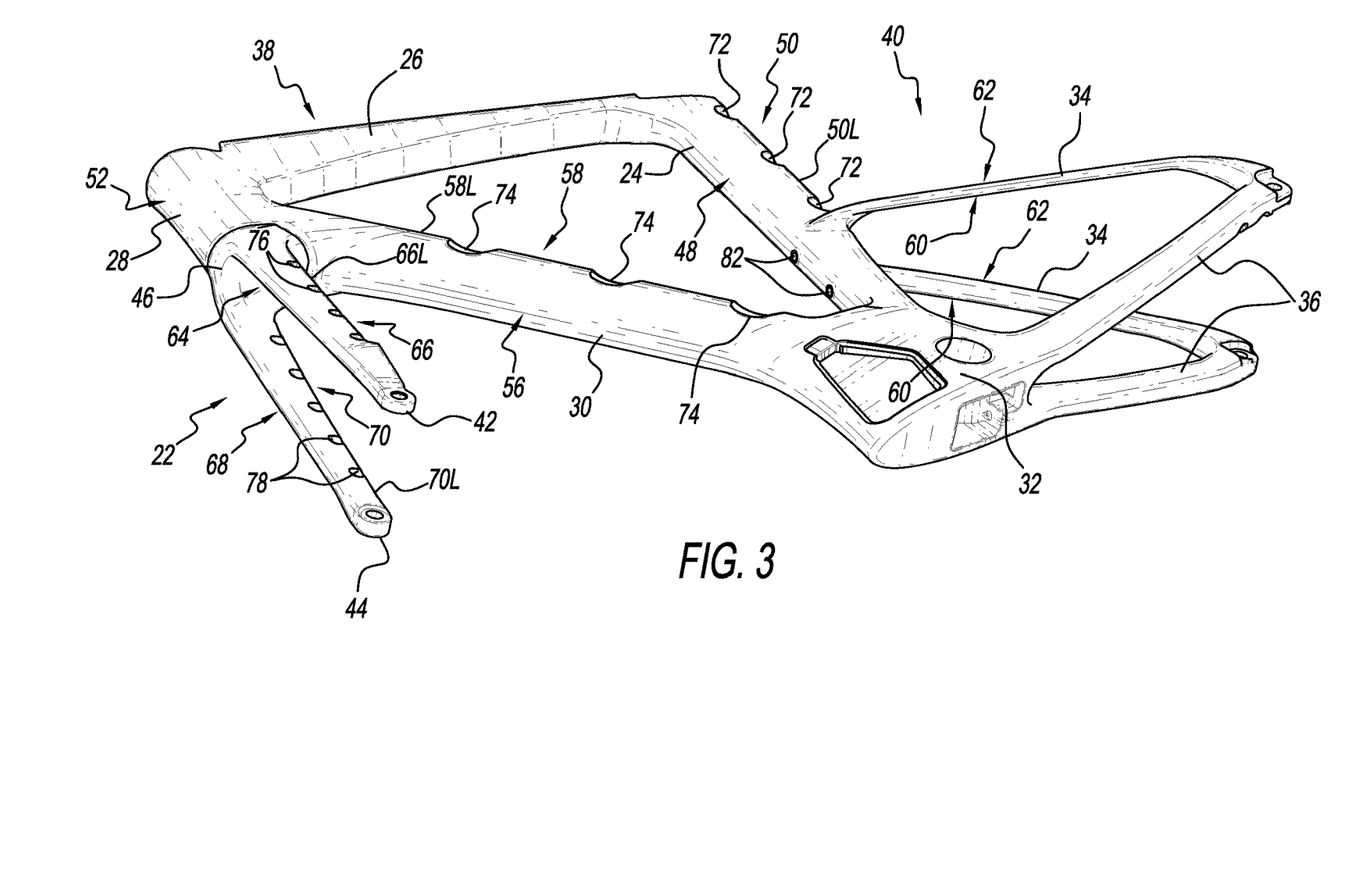
FIG. 3 is another isometric view of the frame portion of FIG. 2.
Figure 4:
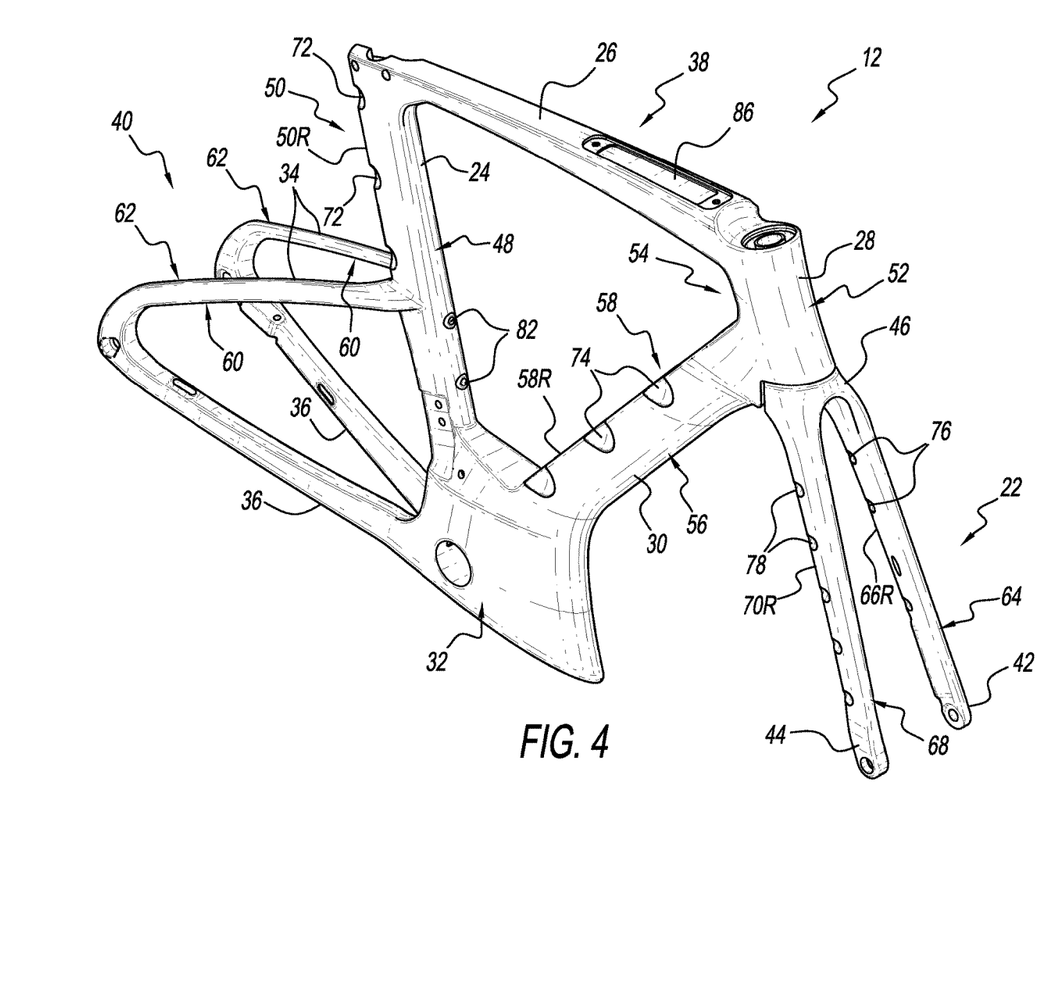
FIG. 4 is another isometric view of the frame portion of FIG. 2.
Figure 5:
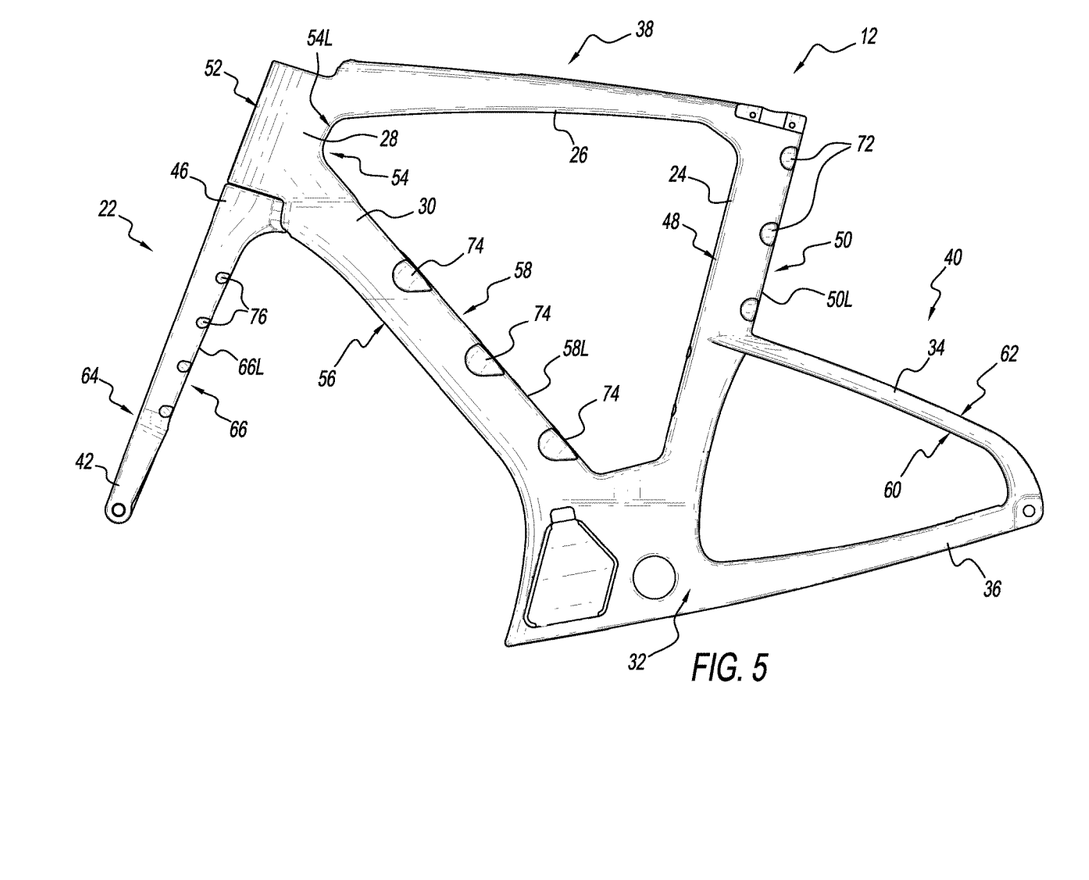
FIG. 5 is a right side elevation view of the frame portion of FIG. 2.
Figure 6:
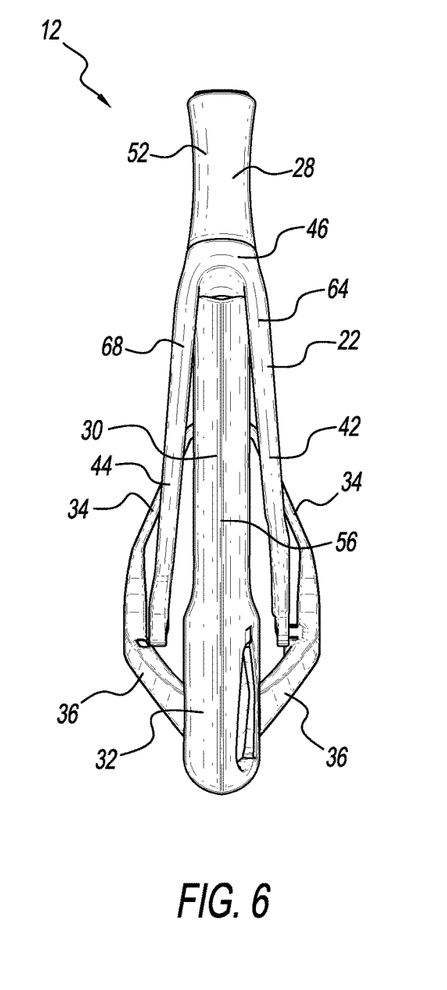
FIG. 6 is a front elevation view of the frame portion of FIG. 2.
Figure 7:
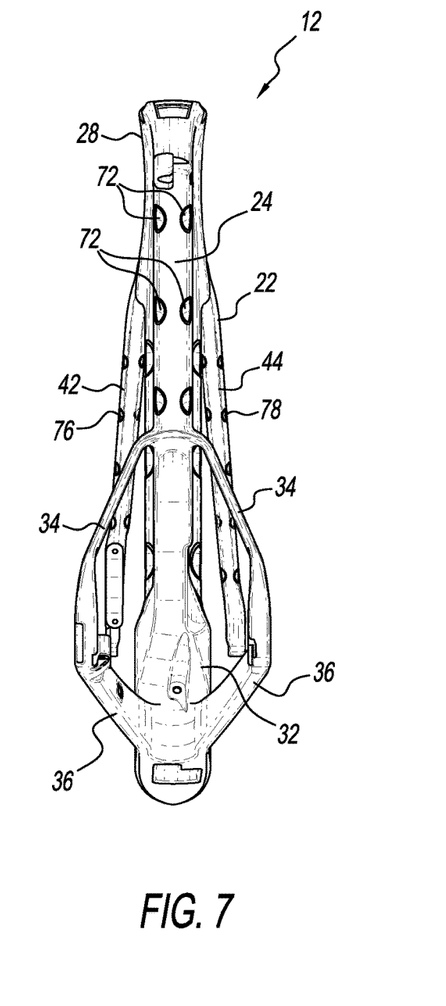
FIG. 7 is a rear elevation view of the frame portion of FIG. 2.
Figure 8:
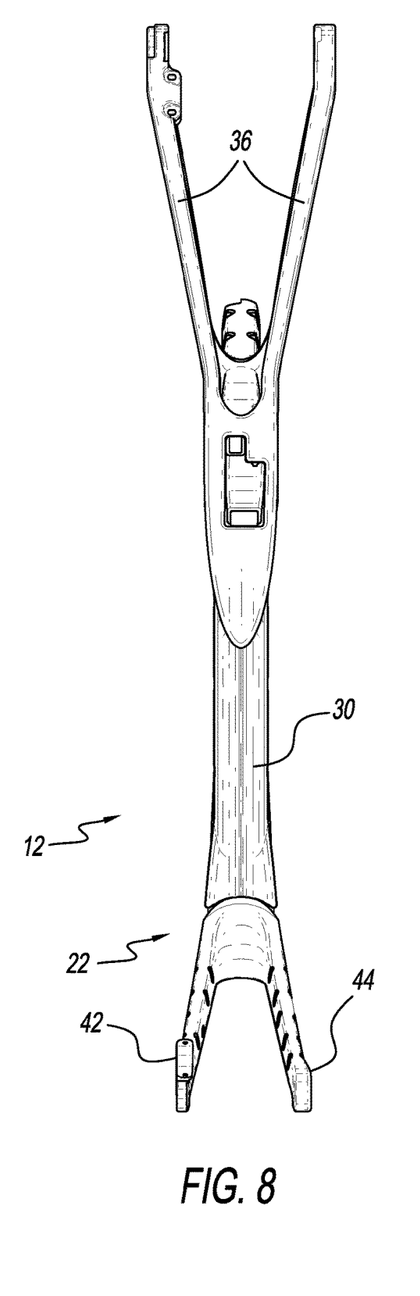
FIG. 8 is a bottom view of the frame portion of FIG. 2.
Figure 9:
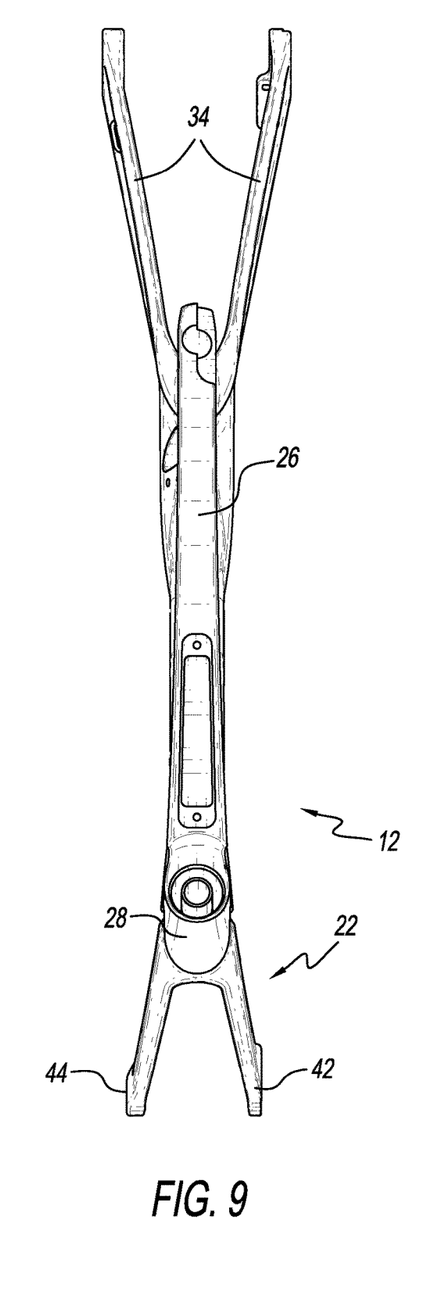
FIG. 9 is a top view of the frame portion of FIG. 2.

FIG. 1 is a side elevation view of bicycle 10. FIGS. 2-4 are various isometric views of frame 12. FIG. 4 is a left side elevation view of frame 12, and FIG. 5 is a right side elevation view of frame 12. FIGS. 6 and 7 are front and rear elevation views of frame 12, respectively. FIG. 8 is a bottom view, and FIG. 9 is a top view of the frame.

With continuing reference to FIGS. 1-9, bicycle 10 includes frame 12, a rear wheel 14 coupled to the frame, a seat 16, and a handlebar 18 steerably coupled to a front wheel 20 via a front fork 22. Frame 12 includes a plurality of elongate frame members. Namely, frame 12 includes a seat tube 24, a top tube 26, a head tube 28, and a down tube 30, as well as a bottom bracket shell portion 32. In some cases, fork 22 may be considered a part of the bicycle frame.

Extending rearward from seat tube 24 and bottom bracket shell portion 32 are a pair of seat stays 34 and a pair of chain stays 36. Although frame 12 includes a full front triangle 38 and rear triangle 40, more or fewer tubes and other components may be included. In some examples, frame 12 may exclude or combine one or more of the down tube, seat tube, and/or stays. In this example, front fork 22 includes fork blades 42 and 44 extending generally downward from a fork crown 46. In some examples, only a single fork blade may be included.

Other than those that are generally horizontal (i.e., top tube 26 and chain stays 36), each of the front-facing tubular components of frame 12 presents a rounded leading edge (or nose) and a blunt trailing edge (or tail). Specifically, seat tube 24 includes leading edge 48 and trailing edge 50, head tube 28 includes leading edge 52 and trailing edge 54, down tube 30 includes leading edge 56 and trailing edge 58, and seat stays 34 include leading edges 60 and trailing edges 62. Selected trailing edges may be further described as having a left corner and a right corner. These corners are designated by an L or an R after the reference numeral, such that seat tube trailing edge 50 has a left corner 50L and a right corner 50R, head tube trailing edge 54 has a left corner 54L and a right corner 54R, down tube trailing edge 58 has a left corner 58L and a right corner 58R.

Similarly, although possibly more elliptical in nature, fork blades 42 and 44 include a rounded leading edge and a blunt trailing edge having identifiable corners. Accordingly, fork blade 42 has a leading edge 64 and a trailing edge 66 with corners 66L and 66R, and fork blade 44 has a leading edge 68 and a trailing edge 70 with corners 70L and 70R.

One or more drag-reduction vortex generators may be implemented at selected ones of the trailing edge corners identified above. As described herein, each of the vortex generators includes a geometric modification of the trailing edge, such that a recessed scoop is formed on a lateral side of the frame member or fork blade. In this example, each scoop has a rounded front profile having a selected vertical dimension, which dimension may fractionally correspond to a side-to-side width of the tube (e.g., 60% of the width, see Section B), and extends horizontally rearward at a selected maximum depth, which depth may correspond to a boundary layer thickness (see Section B). Other suitable front edge profiles may be utilized, such as triangular or faceted. The recessed scoop may be described as an open channel having one closed end (at the front) and one open end (at the rear), extending partially across a respective lateral side of the frame member in a substantially horizontal direction.

As shown in FIGS. 1-9, a respective array of such scoops is included on the seat tube, the down tube, and the fork blades. Specifically, seat tube 24 includes three symmetrically-opposed pairs of scoops 72 (on corners 50L and 50R), down tube 30 includes three symmetrically-opposed pairs of scoops 74 (on corners 58L and 58R), and fork blades 42 and 44 include a plurality of scoops 76 (on corners 66L and 66R) and scoops 78 (on corners 70L and 70R), respectively. Spacing of the scoops in any given array may be determined by a selected relationship (e.g., approximating the characteristic flow instability wavelength of the respective tube/airfoil, see Section B). Scoops may be evenly spaced or distributed along the trailing edge of their host airfoil. The pairs of vortex generators may be separated from each other by unmodified portions or lengths of the airfoil/frame member.

Scoops may be absent from selected, otherwise-eligible elements of frame 12 where stiffness and/or structural strength is a higher priority and/or may be compromised by profile alteration. For example, scoops may be left off head tube 28, an upper portion of down tube 30, and seat stays 34. Conversely, additional scoops may be located on other components having a blunt trailing edge, as desired.

Frame 12 may comprise any suitable material or materials, such as aluminum, steel, or a composite (e.g., carbon fiber). Various connection or mounting points may be included, for items such as a water bottle cage (see mounting points 80, 82) and/or a space-filling aerodynamic transition piece 84 (see mounting points 86) filling the aerodynamic void behind handlebars 18. Remaining portions of bicycle 10, such as a crankset, pedals, gears, derailleurs, etc., are unrelated to the present teachings and are either not shown or are only shown schematically. Any suitable versions of these well-known components may be utilized.

B. Illustrative Vortex Generator and Array Geometry

This section describes geometric aspects of an illustrative vortex generator and vortex generator array, as well as resulting aerodynamic flow characteristics, as depicted in FIGS. 10-15. The vortex generators described in this section are examples of the airfoils and scoop-type vortex generators described above, and relate to various aspects of a selected implementation.

Figure 10:
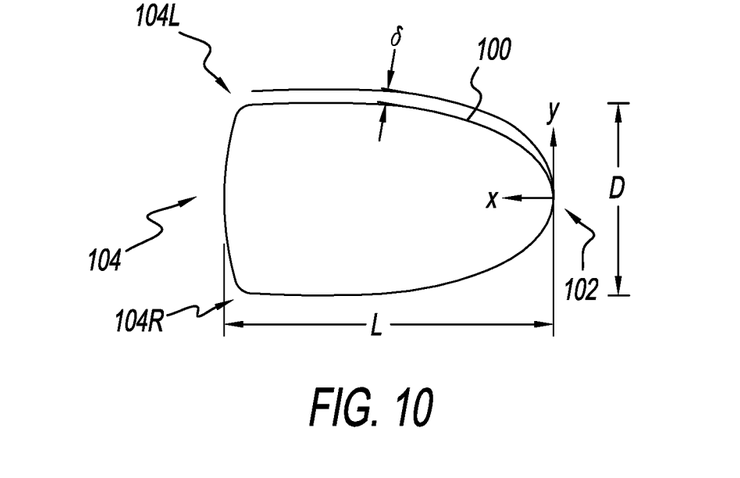
FIG. 10 is a first sectional view of an illustrative airfoil in accordance with aspects of the present disclosure.

FIG. 10 depicts a cross-sectional view of a typical airfoil 100 having a rounded nose or leading edge 102 and a blunt tail or trailing edge 104. This sectional view may be from an unaltered portion or tube of a bike frame (e.g., the upper portion of down tube 30, or any tube of a standard frame). Trailing edge 104 of airfoil 100 includes a left corner 104L and a right corner 104R, corresponding to the left and right corners of the trailing edges of frame 12 (e.g., trailing edges 50, 54, 58, 62). Furthermore, airfoil 100 includes a front-to-back length L and a side-to-side width D. Aspects of airfoil 100 may be described in relation to X and Y dimensions, as shown in FIG. 10, where X is oriented along the length of the airfoil and Y is oriented along the width.

As airfoil 100 (e.g., one of the substantially vertical frame members described in Section A) travels through the air, aerodynamic effects are experienced. One of these is known as a boundary layer (designated in FIG. 10), which is the layer in which air molecules gradually transition from a stationary state at the wall up to the same speed as molecules outside the layer (also known as the free-stream velocity). Boundary layer 106 has a thickness □ that varies in the X direction, according to known principles.

Figure 11:
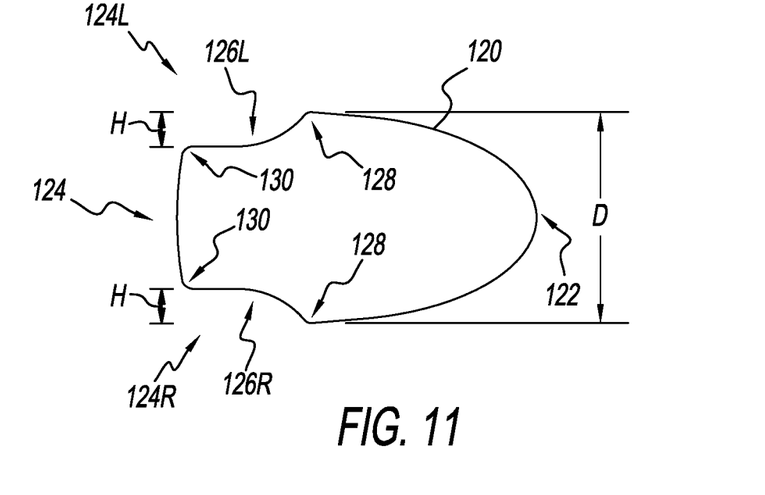
FIG. 11 is a second sectional view of an illustrative airfoil in accordance with aspects of the present disclosure.
Figure 12:
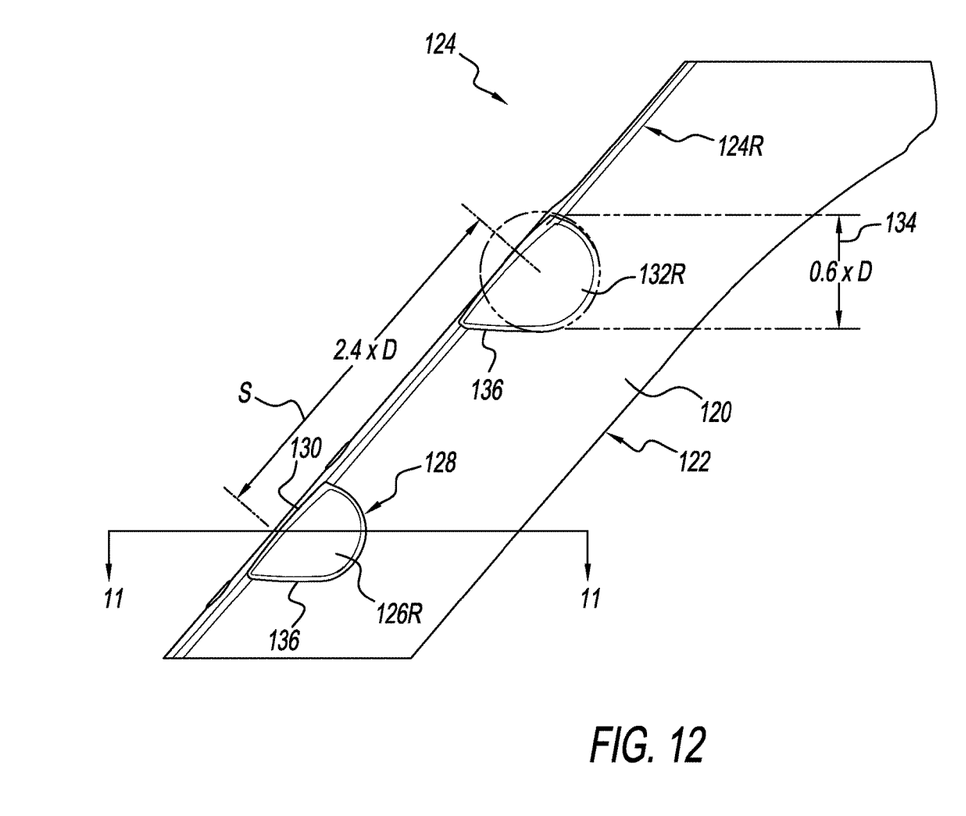
FIG. 12 is a partial side elevation view of the airfoil of FIG. 11.

FIG. 11 depicts a cross-sectional view of an airfoil 120 taken along cut line 11-11 in FIG. 12. In this example, airfoil 120 is substantially similar to airfoil 100, having a width D, a rounded leading edge 122 and a blunt trailing edge 124. Airfoil 120, however, includes a recessed vortex generator at both trailing edge corners 124L and 124R. Specifically, a left scoop 126L and a right scoop 126R are present as geometric alterations of the unmodified trailing edge profile shown in FIG. 10. Scoops 126L and 126R are symmetrical, each having a same depth H. In this example, the wall of the scoops slopes inward, in a continuous and curvilinear fashion, from the outer wall of airfoil 120 to the rear of the airfoil at trailing edge 124. The wall of each scoop also slopes curvilinearly toward the upper and lower boundaries of the scoop, forming a half-bowl-shaped depression at a forward edge 128 and a curve-bottomed open-ended channel at a rear edge 130 (similar to a half-pipe).

Turning to FIG. 12, a portion of airfoil 120 is shown in side elevation view. Here, a pair of scoops are depicted on airfoil 120, namely scoop 126R and a second scoop 132R. As shown in FIG. 12, scoops 126R and 132R are substantially identical and have a vertical dimension 134. Vertical dimension 134 may be any suitable length, and may be approximately 0.6 times tube width D (the side-to-side width of airfoil 120). Also as depicted in FIG. 12, the maximum vertical dimension of the scoops may correspond to the forward-most intersection of the scoop with trailing edge 124. Accordingly, in this example where airfoil 120 is inclined forward, scoops 126R and 132R are widest at their respective upper intersection with trailing edge 124.

In a rearward (i.e., downstream) direction, scoops 126R and 132R continue horizontally, with a lower edge 136 being substantially horizontal regardless of the inclination of the airfoil. Front edge 128 of the scoop is, in this example, curved, circular, or arcuate. In some examples, front edge 128 may be rectilinear or faceted (e.g., similar to a partial polygon).

Each vortex-generating scoop may be paired with another scoop on the opposite trailing edge corner, in a symmetrical geometry. As mentioned above, arrays of two or more pairs of scoops may be spaced along the trailing edge of the airfoil (i.e., frame or fork component). In FIG. 12, an array of two pairs is shown from a right side view, such that two adjacent right-side scoops are depicted. Adjacent, spaced-apart scoops may have a separation distance S, e.g., as measured center to center, which generally corresponds to a wavelength of the expected flow instability. A suitable value for distance S has been found to be approximately 2.4 times the side-to-side width D of the airfoil. Other values may be appropriate. In general, the scoop pairs may be spaced along the trailing edge at regular intervals to ensure adequate wake modification and drag reduction. Said another way, a pair of scoops may provide a benefit the effects of which extend along the trailing edge for a certain edge distance. Additional pairs of scoops may be deployed to cover selected remaining distances.

Figure 13:
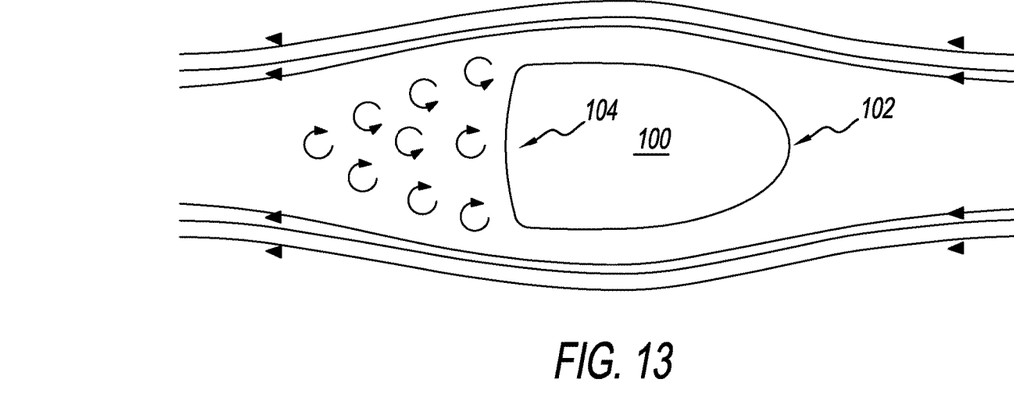
FIG. 13 is a schematic view depicting illustrative air flow around the airfoil of FIG. 10.
Figure 14:
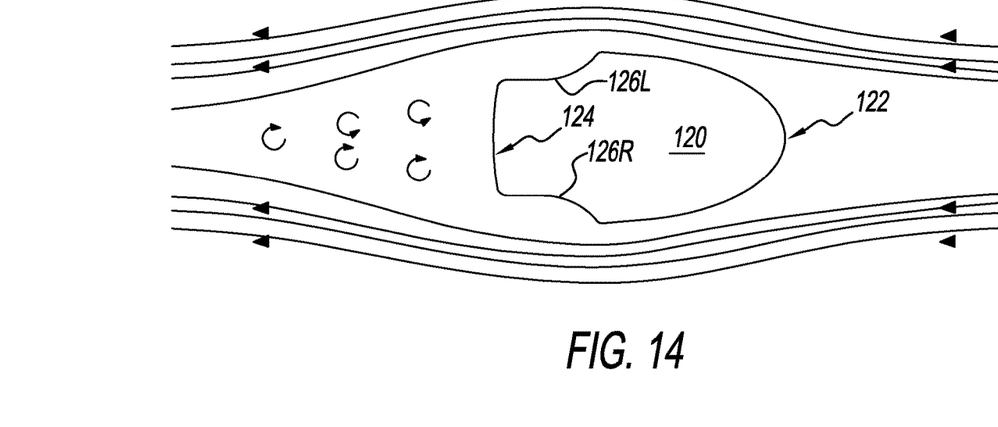
FIG. 14 is a schematic view depicting illustrative air flow around the airfoil of FIG. 11.

FIGS. 13 and 14 are schematic depictions of illustrative air flows around the two different airfoils described above. FIG. 13 shows the blunt trailing edge airfoil 100, with corresponding large vortices and turbulent flow. FIG. 14 shows the modified airfoil 120 having trailing edge vortex generators 126L and 126R, with corresponding smaller vortices and reduced turbulence.

Figure 15:
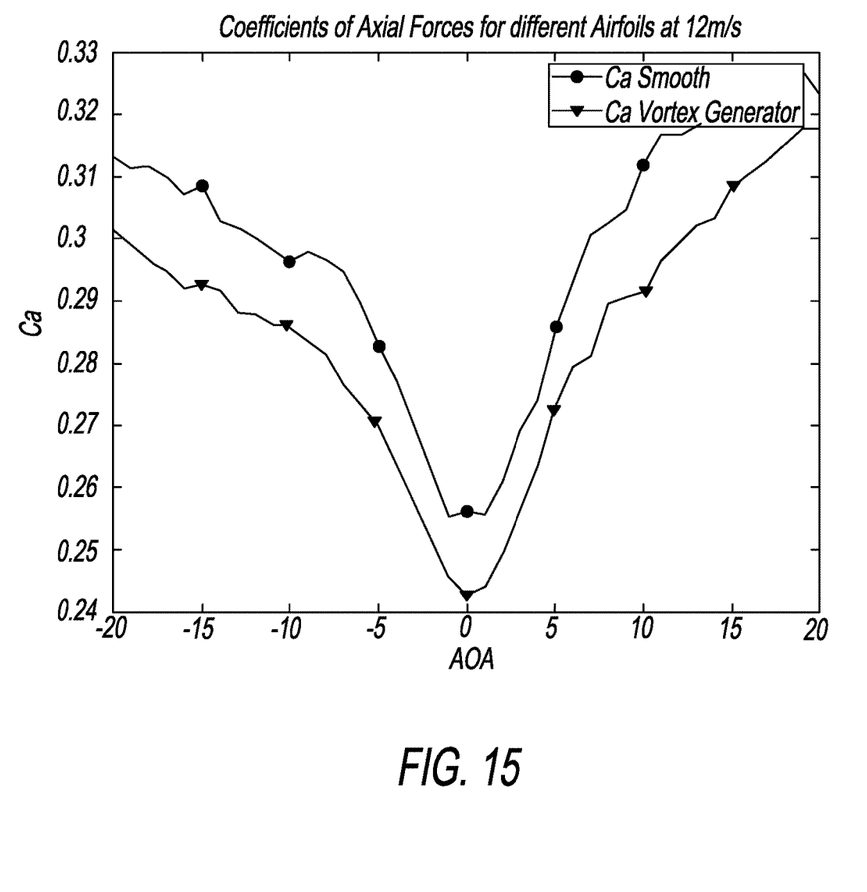
FIG. 15 is a chart showing illustrative differences in drag coefficient vs. angle of attack for two selected airfoils.

FIG. 15 is a graph of illustrative performance data for airfoils similar to airfoil 100 and airfoil 120. At 12 m/second, it can be seen that the drag (i.e., coefficient of axial force (Ca)) of the airfoil having vortex generators disclosed herein is better (i.e., lower) than that of the unmodified airfoil, for all angles of attack (AOA). It has also been determined that the beneficial effect of the vortex generators described herein exists for a range of speeds that correspond to typical bicycle racing speeds, e.g., 12 to 15 meters per second.

C. Additional Examples and Illustrative Combinations

This section describes additional aspects and features of aerodynamic bicycle frames, as well as related methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A bicycle comprising:
a bicycle frame coupled to a front fork, the frame and fork in combination including an elongate member having a side-to-side width and defining an airfoil having a blunt trailing edge; and
an array of one or more pairs of vortex generators on the trailing edge, each pair of vortex generators including a left vortex generator disposed on a left corner of the trailing edge and a symmetrical right vortex generator disposed on a right corner of the trailing edge;
wherein each vortex generator comprises a recess formed in the elongate member, the recess having a bowl-shaped front end portion extending rearward as an open channel, the vortex generator having a maximum vertical dimension smaller than the width of the elongate member.

A1. The bicycle of A0, wherein the maximum vertical dimension of the vortex generator is approximately 0.6 times the width of the frame member.

A2. The bicycle of A0, wherein the array of one or more pairs of vortex generators includes two pairs of vortex generators spaced along the trailing edge.

A3. The bicycle of A2, wherein the array of one or more pairs of vortex generators includes three pairs of vortex generators spaced at regular intervals along the trailing edge.

A4. The bicycle of A2, wherein the two pairs of vortex generators are spaced apart by a distance equal to approximately 2.4 times the width of the elongate member.

A5. The bicycle of A0, wherein the elongate member is a down tube.

A6. The bicycle of A0, wherein the elongate member is a fork blade of the front fork.

A7. The bicycle of A0, wherein the front end portion of the vortex generator has a curved front edge.

B0. A bicycle frame comprising:
a front triangle including a down tube having a first lateral width and a seat tube having a second lateral width;
a plurality of first recessed vortex generators symmetrically disposed on opposing corners of a blunt trailing edge of the down tube, each of the first recessed vortex generators comprising a scoop formed in the respective corner of the blunt trailing edge and having a first vertical dimension approximately equal to 0.6 times the first lateral width;
a plurality of second recessed vortex generators symmetrically disposed on opposing corners of a blunt trailing edge of the seat tube, each of the second recessed vortex generators comprising a scoop formed in the respective corner of the blunt trailing edge and having a second vertical dimension approximately equal to 0.6 times the second lateral width;

B1. The bicycle frame of B0, wherein the plurality of first recessed vortex generators are disposed as pairs of scoops spaced along the trailing edge of the down tube, each pair of scoops being separated from one or more adjacent pairs of scoops by an unmodified portion of the down tube.

B2. The bicycle frame of B1, wherein adjacent pairs of scoops are spaced apart along the trailing edge of the down tube at a distance of approximately 2.4 times the first lateral width.

B3. The bicycle frame of B0, wherein the plurality of second recessed vortex generators are disposed as pairs of scoops spaced along the trailing edge of the seat tube, each pair of scoops being separated from one or more adjacent pairs of scoops by an unmodified portion of the seat tube.

B4. The bicycle frame of B3, wherein adjacent pairs of scoops are spaced apart along the trailing edge of the seat tube at a distance of approximately 2.4 times the second lateral width.

B5. The bicycle frame of B0, wherein each of the first recessed vortex generators has a curved front edge and leads substantially horizontally rearward as an open-ended channel.

B6. The bicycle frame of B5, wherein each of the first recessed vortex generators extends less than half way across a front-to-rear length of the down tube.

C0. A bicycle comprising:
a frame including a plurality of elongate frame members;
a front fork assembly pivotably coupled to the frame; and
a handlebar steerably coupled to the front fork assembly;
wherein a first frame member of the plurality of frame members has a rounded leading edge, a blunt trailing edge, and a first lateral width, the blunt trailing edge including a first open channel disposed at a left corner of the trailing edge and an opposing second open channel disposed at a right corner of the trailing edge, each of the open channels extending horizontally across a rear portion of a respective lateral side of the first frame member.

C1. The bicycle of C0, further comprising a third open channel substantially identical to the first open channel and an opposing fourth open channel substantially identical to the second open channel, the third and fourth open channels being spaced from the first and second open channels along the trailing edge of the first frame member at a selected distance.

C2. The bicycle of C1, wherein the selected distance is approximately 2.4 times the first lateral width.

C3. The bicycle of C0, wherein the first and second open channels each has a rounded front profile.

C4. The bicycle of C0, wherein each of the first and second channels has a maximum vertical dimension equal to approximately 60% of the first lateral width.

C5. The bicycle of C0, wherein a second frame member of the plurality of frame members has a rounded leading edge, a blunt trailing edge, and a second lateral width, the blunt trailing edge including a fifth open channel disposed at a left corner of the trailing edge and an opposing sixth open channel disposed at a right corner of the trailing edge, each of the open channels extending horizontally across a rear portion of a respective lateral side of the second frame member.

C6. The bicycle of C5, wherein each of the fifth and sixth channels has a maximum vertical dimension equal to approximately 60% of the lateral width.

C7. The bicycle of C0, wherein each of the first and second channels has a depth corresponding to a boundary layer thickness in the vicinity of the respective channel.

C8. The bicycle of C0, further comprising a space-filling block mounted to a top tube of the frame adjacent a stem of the handlebar, the block tapering from a first height at a front end to a shorter second height at a rear end, wherein the front height corresponds to a height of the handlebar stem.

D0. A method of reducing aerodynamic drag of a bicycle frame, the method comprising:
passing an air stream transversely over a generally vertical bicycle frame member having a rounded leading edge and a blunt trailing edge;
generating counter-rotating streamwise vortices at selected locations along the trailing edge of the frame member by passing portions of the air stream over vortex-generating scoop-shaped channels at opposing corners of the trailing edge;
wherein the scoop-shaped channels are arranged in opposing pairs and the opposing pairs are spaced along the trailing edge at intervals generally corresponding to a wavelength of the expected flow instability.

D1. The method of D0, wherein the wavelength is approximately 2.4 times a side-to-side width of the bicycle frame member.

D2. The method of D0, wherein the bicycle frame member comprises a down tube.

D3. The method of D0, wherein the bicycle frame member comprises a fork blade.

Advantages, Features, Benefits

The different embodiments and examples of the aerodynamic bicycle frames described herein provide several advantages over known solutions. For example, illustrative embodiments and examples described herein allow a reduction in drag, facilitating faster riding speed for the same level of rider effort. Specifically, the present disclosure provides up to about a 20% improvement in inherent drag over unmodified designs.

Additionally, and among other benefits, illustrative embodiments and examples described herein provide vortex generator functionality and benefits without a need for protruding members such as fins or winglets, thereby avoiding added drag, mechanical interference, and potential safety issues.

Additionally, and among other benefits, illustrative embodiments and examples described herein provide an aesthetically pleasing appearance to the bicycle frame.

No known system or device can perform these functions, particularly in the field of bicycle frame aerodynamics. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A bicycle comprising:
a bicycle frame coupled to a front fork, the frame and fork in combination including an elongate member having a side-to-side width and defining an airfoil having a blunt trailing edge; and
an array of one or more pairs of vortex generators on the blunt trailing edge, each pair of vortex generators including a left vortex generator disposed on a left corner of the blunt trailing edge and a symmetrical right vortex generator disposed on a right corner of the blunt trailing edge;
wherein each vortex generator comprises a recess formed in the elongate member, the recess having a bowl-shaped front end portion extending rearward as an open channel, the vortex generator having a maximum vertical dimension smaller than the width of the elongate member; and
wherein the array of one or more pairs of vortex generators includes two pairs of vortex generators spaced apart along the trailing edge by a distance equal to approximately 2.4 times the width of the elongate member.

2. The bicycle of claim 1, wherein the maximum vertical dimension of the vortex generator is approximately 0.6 times the width of the elongate member.

3. The bicycle of claim 1, wherein the array of one or more pairs of vortex generators includes three pairs of vortex generators spaced at regular intervals along the trailing edge.

4. The bicycle of claim 1, wherein the elongate member comprises a down tube.

5. The bicycle of claim 1, wherein the elongate member comprises a fork blade of the front fork.

6. The bicycle of claim 1, wherein each of the vortex generators extends less than half way across a front-to-rear length of the elongate member.

7. A bicycle frame comprising:
a front triangle including a down tube having a first lateral width and a seat tube having a second lateral width;
a plurality of first recessed vortex generators symmetrically disposed on opposing corners of a blunt trailing edge of the down tube, each of the first recessed vortex generators comprising a scoop formed in a respective one of the opposing corners of the blunt trailing edge and having a first vertical dimension approximately equal to 0.6 times the first lateral width; and
a plurality of second recessed vortex generators symmetrically disposed on opposing corners of a blunt trailing edge of the seat tube, each of the second recessed vortex generators comprising a scoop formed in a respective one of the opposing corners of the blunt trailing edge and having a second vertical dimension approximately equal to 0.6 times the second lateral width;
wherein the plurality of first recessed vortex generators are disposed as pairs of scoops spaced along the trailing edge of the down tube, each pair of scoops being separated from one or more adjacent pairs of scoops by an unmodified portion of the down tube, such that adjacent pairs of scoops are spaced apart along the trailing edge of the down tube at a distance of approximately 2.4 times the first lateral width.

8. The bicycle frame of claim 7, wherein the plurality of second recessed vortex generators are disposed as pairs of scoops spaced along the trailing edge of the seat tube, each pair of scoops being separated from one or more adjacent pairs of scoops by an unmodified portion of the seat tube.

9. The bicycle frame of claim 7, wherein each of the first recessed vortex generators comprises a substantially horizontal, open channel including a closed front end having a curved profile and an open rear end at the trailing edge.

10. The bicycle frame of claim 7, wherein each of the first recessed vortex generators extends less than half way across a front-to-rear length of the down tube.

11. A bicycle comprising:
a frame including a plurality of elongate frame members;
a front fork assembly pivotably coupled to the frame; and
a handlebar steerably coupled to the front fork assembly;
wherein a first frame member of the plurality of frame members has a rounded leading edge, a blunt trailing edge, and a first lateral width, the blunt trailing edge including a first open channel disposed at a left corner of the trailing edge and an opposing second open channel disposed at a right corner of the trailing edge, each of the open channels extending horizontally across a rear portion of a respective lateral side of the first frame member; and
a third open channel substantially identical to the first open channel and an opposing fourth open channel substantially identical to the second open channel, the third and fourth open channels being spaced from the first and second open channels along the trailing edge of the first frame member at a distance of approximately 2.4 times the first lateral width.

12. The bicycle of claim 11, wherein the first and second open channels each has a rounded front profile.

13. The bicycle of claim 11, wherein each of the first and second channels has a maximum vertical dimension equal to approximately 60% of the first lateral width.

14. The bicycle of claim 11, wherein each of the first and second channels has a depth corresponding to a boundary layer thickness in a vicinity of the respective channel.

15. The bicycle of claim 11, further comprising a space-filling block mounted to a top tube of the frame adjacent the handlebar, the block tapering from a first height at a front end to a shorter second height at a rear end, wherein the front height corresponds to a height of the handlebar.

16. The bicycle of claim 11, wherein each of the open channels extends less than half way across a front-to-rear length of the first frame member.

* * * * *